United States Patent
Metz et al.

(10) Patent No.: US 11,499,804 B2
(45) Date of Patent: Nov. 15, 2022

(54) MISSILE FOR INTERCEPTING ALIEN DRONES

(71) Applicants: RHEINMETALL AIR DEFENCE AG, Zurich (CH); SKYSEC GMBH, Turbenthal (CH)

(72) Inventors: Manuel Metz, Ettenhausen (CH); Franco Metz, Ettenhausen (CH)

(73) Assignees: RHEINMETALL AIR DEFENCE AG, Zurich (CH); SKYSEC GMBH, Turbenthal (CH)

( * ) Notice: Subject to any disclaimer, the term of this patent is extended or adjusted under 35 U.S.C. 154(b) by 23 days.

(21) Appl. No.: 16/465,439

(22) PCT Filed: Dec. 1, 2017

(86) PCT No.: PCT/EP2017/001402
§ 371 (c)(1),
(2) Date: May 30, 2019

(87) PCT Pub. No.: WO2018/099603
PCT Pub. Date: Jun. 7, 2018

(65) Prior Publication Data
US 2020/0003530 A1  Jan. 2, 2020

Related U.S. Application Data

(60) Provisional application No. 62/429,153, filed on Dec. 2, 2016.

(51) Int. Cl.
*F41H 11/02* (2006.01)
*F41F 3/042* (2006.01)
*F41F 3/077* (2006.01)
*F41H 13/00* (2006.01)
*F42B 10/62* (2006.01)
(Continued)

(52) U.S. Cl.
CPC ............ *F41H 11/02* (2013.01); *B64C 39/024* (2013.01); *F41F 3/042* (2013.01); *F41F 3/077* (2013.01); *F41H 13/0006* (2013.01); *F42B 10/62* (2013.01); *F42B 12/66* (2013.01); *B64C 2201/182* (2013.01)

(58) Field of Classification Search
CPC ... F41H 11/02; F41H 13/0006; B64C 39/024; B64C 2201/182; F41F 3/042; F41F 3/077; F42B 10/62; F42B 12/66
USPC ........................................................ 102/504
See application file for complete search history.

(56) References Cited

U.S. PATENT DOCUMENTS 5,583,311 A * 12/1996 Rieger .................... F41H 11/04
  102/405
8,205,537 B1 * 6/2012 Dupont ............... F41H 13/0006
  102/504
9,074,858 B2 * 7/2015 Yee .......................... F41H 11/02
(Continued)

*Primary Examiner* — Samir Abdosh

(57) ABSTRACT

The invention relates to a missile (1) for intercepting alien drones (21), comprising a capturing net (9) and a parachute (18), wherein a plurality of weights (15) are connected to the capturing net (9), wherein the capturing net (9) can be ejected from the missile (1) and the weights (15) can be ejected from the missile (1). The capturing of the alien drone is improved by the fact that the capturing net (9) can be ejected by a first means and the weights (15) can be ejected by a second means, wherein the weights (15) and the capturing net (9) can be ejected at different times from the missile (1).

16 Claims, 6 Drawing Sheets

Figure 1:
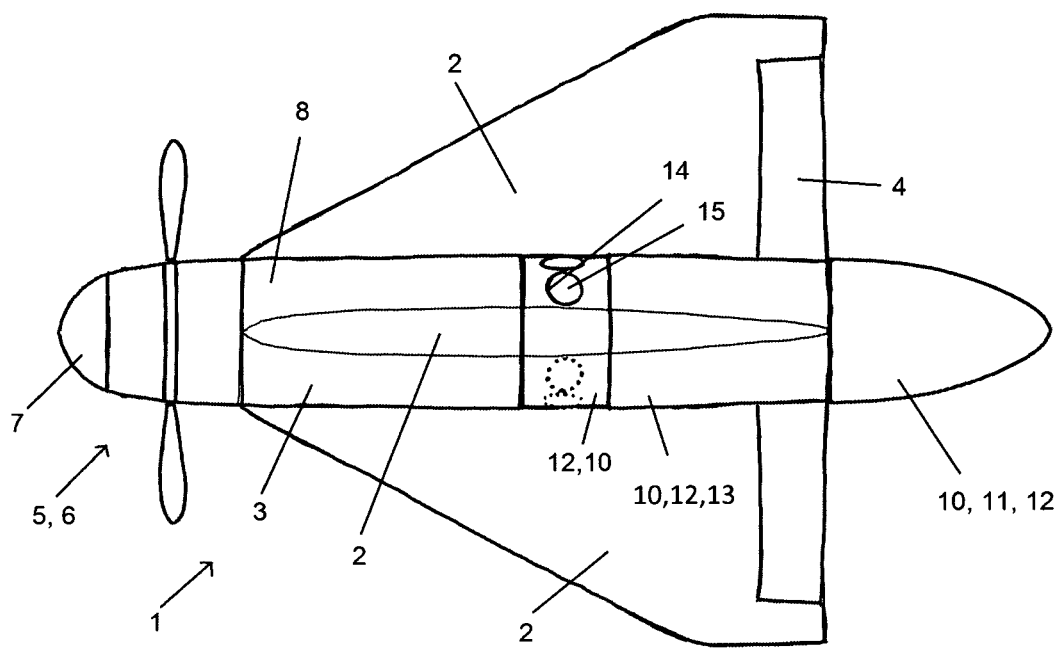

(51) Int. Cl.
*F42B 12/66* (2006.01)
*B64C 39/02* (2006.01)

(56) References Cited

U.S. PATENT DOCUMENTS

| | | | |
|---|---|---|---|
| 10,197,365 B1* | 2/2019 | Blyskal | F42B 12/68 |
| 2012/0192707 A1* | 8/2012 | Rogers | F41H 13/0006 |
| | | | 89/36.08 |
| 2012/0210904 A1* | 8/2012 | Merems | F41H 11/02 |
| | | | 102/504 |
| 2014/0216290 A1* | 8/2014 | Yee | F42B 15/00 |
| | | | 102/374 |

* cited by examiner

MISSILE FOR INTERCEPTING ALIEN DRONES

The invention relates to a missile for intercepting alien drones with the features of the preamble of Claim 1.

The missile comprises a capturing net, wherein a plurality of weights is attached to the capturing net. The capturing net and the weights can be ejected at a provided point of time in order to capture an alien drone. The alien drone is thus entangled in the capturing net and can no longer continue its planned flight path.

From EP 0 175 914 A1 a missile in the form of a projectile for counteracting freely moving objects is known. The projectile is moved in the direction of an object to be counteracted by thrust power. At a certain distance from the object, a capturing net is ejected from a sleeve body so that the capturing net is deployed over a large area. The capturing net is thus deployed in the flight direction seen behind the projectile. The capturing net is stored in a rear part of the projectile before ejection. For example, the projectile can be launched from a gun barrel or a cannister or moved in the direction of the object to be counteracted by means of thrust power generated by its own suitable means. The projectile can be directed by a suitable launcher to the object in a guided, deflected, ballistic or aerodynamic or hydrodynamic manner. The projectile can be formed as a drone. Before reaching the object to be counteracted, a ground part of the missile is ejected from a sleeve body at a predetermined breaking point by igniting an ignition element and thus by the action of an ignited propellant charge. The sleeve body is thus separated into two symmetrical parts with the ground part and with the ignition element. In one embodiment, the sleeve parts are connected to the net via a spring means, wherein after blasting, these sleeve parts serve as weights which span the net.

From U.S. Pat. No. 6,626,077 B1 a missile for intercepting other flying objects with a capturing net is known. A plurality of weights is attached circumferentially to the capturing net. A rocket or a manned or unmanned flying object can serve as a missile. The missile comprises a head with a capturing net, wherein the head can be blasted by means of an explosive charge, wherein housing parts of the head serve as weights in order to span the capturing net. As the capturing net is arranged on the head of the missile, there is a risk that the alien missile will not be captured by spanning the capturing net, but that the missile itself will be captured by the capturing net due to the strong braking effect of the net and thus the actual capturing effect against the alien missile will not occur. A plurality of parachutes should be attached to the capturing net, which decelerate the captured alien missile together with the capturing net during the fall to the ground.

From RU 249 0 584 C1 a missile for intercepting alien drones is known. The missile is formed as a type of model aircraft with an aircraft fuselage, wings and a tail unit. The missile comprises a plurality of capturing nets at the ends of which weights are attached. Four cartridges with capturing nets are contained in the missile. The weights are thus arranged inside the cartridges. The cartridges are arranged to the right and left and above and below the aircraft fuselage. Furthermore, a parachute is arranged in each of the cartridges. The missile is controlled from the ground when accessing the drone so that the alien drone is approached from behind. When the alien drone is 500 m away from being reached, the alien drone is detected by means of a video camera, wherein the operator now adapts the flight speed to the flight speed of the alien drone. If only one of the sensors on the aircraft fuselage detects the alien drone, the net and the weights are automatically shot out together. When the alien drone is captured by the net, pyrotechnic cartridges are ignited which jettison the housing of the cartridges and release a parachute.

The missiles described at the outset are not yet formed in an optimal manner. It has been found that in practice it is difficult to unfold the capturing net during flight and to safely capture the foreign drone.

The object of the invention is to improve the capture of alien drones. This object of the invention is now achieved by means of a missile with the features of Claim 1.

The capturing net can be ejected by means of a first means and the weights can be ejected by means of a second means, wherein the weights and the capturing net can be ejected from the missile at different points of time. This ensures the spanning of the capturing net. The capturing net is initially arranged inside a container. The container is ejected first, for example by means of pressurised air or at least one pyrotechnic propellant. Only then, in a second step, are the weights which are connected to the circumference of the capturing net via flexible connection means or ropes ejected from the missile. Thus, the capturing net is pulled out of the container first. This ensures that when ejecting the weights, the capturing net is not yet unfolded, but has already unrolled. Thus, the risk of the capturing net becoming entangled before the alien drone is captured is reduced. The container is arranged on a rear area of the missile. In particular the container forms the end of the fuselage of the missile. The container is ejected against the flight direction, i.e. backwards. The net is located in a container which forms the rear area of the missile. The container can be ejected by the first means. The weights are connected with flexible connection means which lead from the weights to the net. These connection means are led out of the container and outside on the fuselage to the weights which are inserted there in ejector receptacles provided for that purpose. The ejector receptacles are distributed so that they face away from one another. Spanning of the capturing net takes place in two phases. In the first phase, the container is ejected backwards with the capturing net. After a certain defined time, after most of the net has left the container and the fuselage, the weights are ejected out of the ejector receptacles. This time preferably depends on the airspeed of the missile. The ejection force is great enough that the capturing net can be spanned by the weights. The net ejection sequence is or can be triggered in different ways, for example by means of a sensor in a seeker with a proximity radar, with a stereo imaging system or with an ultrasonic sensor, for example, or by means of pure external triggering via a wireless connection. Furthermore, distance triggering of the net ejection sequence is conceivable.

The missile has a drive in the front area of its fuselage. The drive is arranged in front of the centre of gravity of the missile. The drive is arranged in the bow area of the missile. This has the advantage that the weights and the net can be arranged behind the drive. In particular, the drive consists of a propeller drive. The drive preferably has an electric motor. The weights are preferably arranged in the area of the centre of gravity of the missile. This improves the manoeuvrability of the missile.

In particular, the missile comprises a plurality of wings. Preferably, the missile comprises four wings to be able to immediately accelerate the missile in all transverse directions. The drive of the missile is realised such that additional electronics are mounted or can be mounted in front of the drive and/or behind the drive. The missile has the form of a rocket, whereby a high airspeed can be achieved. The airspeed is preferably more than 100 km/h, preferably more than 200 km/h.

A parachute and the net in particular are arranged in the central and rear area of the missile. These can be ejected via the on-board electronics or via an external control command. The on-board electronics can autonomously or manually trigger an electric signal which can eject the parachute, the weights by means of the ejector receptacles and the container in any desired time sequence.

The on-board electronics of the missile are able to steer or navigate the missile autonomously or with external control commands. The control of the missile is carried out via aerodynamic control surfaces and/or via swivelling the drive.

The missile finds the object to be flown towards by means of a seeker. The seeker is preferably arranged in front of the drive. The seeker can either have a radar or an optical system.

The missile serves to convey the capturing net located inside the container to another missile or object. This can take place in the air or on the ground. The navigation occurs autonomously or by means of manual control commands. The missile is sent information about the location or the direction of the object to be flown towards by means of a wireless data connection.

The launch of the missile is carried out from a ramp or by means of a launching arrangement which comprises a container. The landing of the missile is carried out with a parachute. The parachute is initially arranged within the missile. It is conceivable to arrange a plurality of parachutes in the missile, wherein at least one of the parachutes is connected to the missile and at least one of the parachutes is connected to the net.

Preferably, a plurality of weights, in particular four weights are connected with the net edge of the net. The flexible connection can thus be formed by cords, lines, ropes, wires, chains or similar. The weights are preferably each attached to the capturing net with a rope. The weights serve to span the capturing net. If all weights are pulled away from one another, the capturing net will be spanned. The capturing net is connected to the missile via a further flexible connection such as a rope or wire, or chain or similar so that when something is captured with the capturing net, the capturing net and the captured object are connected to the missile and thus also to the parachute.

So that the missile and possible captured objects can be brought to the ground with as little damage as possible, a parachute is used which is connected to the missile. The parachute is preferably located in front of the capturing net. The parachute is connected to the capturing net and in the event of a hit is automatically triggered by the braking action or the lag of the captured alien drone in the capturing net. If the target is missed, the parachute is ejected by the on-board electronics after a defined amount of time. The capturing net pulls the parachute out of the missile once the object or alien drone has been captured in the net and this object and this object develops a lag or a force on a connecting rope. An ejection charge is preferably arranged in a front area which serves to eject the parachute in the event of a missed hit. It is conceivable to arrange a plurality of parachutes in the missile wherein at least one of the parachutes is connected to the missile and at least one of the parachutes is connected to the net.

Preferably, the missile has a replaceable unit, wherein the replaceable unit comprises the container for the parachute and a fuselage part with a hollow space for the parachute. This replaceable unit furthermore preferably comprises the ejector receptacles for the weights. The replaceable unit can be or is preferably connected to the front fuselage part via a catch or bayonet connection. The use of a replaceable unit with the capturing net, the weights and the parachute as well as the means assigned for ejecting these has the advantage that after an interception attempt the missile can quickly be made ready to use again in that a new replaceable unit is connected to the fuselage part with the drive. The use of a replaceable unit has the advantage that the parachute and/or the capturing net do not have to be folded and rolled up again every time to be able to make the missile ready for use. The fuselage part of the replaceable unit comprises an open hollow space in the direction of the container, wherein the parachute is arranged in the hollow space. The parachute is thus connected on the one hand to the capturing net via a flexibleconnection means or a line, a rope or similar and preferably connected to a base or a side wall of the fuselage on the other hand so that both the capturing net with the alien drone and the missile itself can be landed by means of the parachute. The fuselage part is preferably coupled to the on-board electronics and/or a power supply via an electronic or optical contact so that the ejector receptacles and/or the means of ejecting the container and/or the means of ejecting the parachute can be triggered during the flight.

Once a target object has been recognised in terms of its position or direction vector, the missile can be launched. The missile flies towards the target by means of the on-board electronics and the position data of the target which is made available via a data link of the on-board electronics. In addition, navigation guidance can be supported by a seeker. Before the missile crosses the target, object or reaches the target object, the container with the capturing net are ejected and the weights on the edge of the capturing net are sequentially ejected so that the net unfolds behind the missile. Once the target object has been captured in the capturing net, the capturing net with the captured target object pulls the parachute out of the missile. If no object has been captured with the capturing net, the parachute is ejected. The missile can be landed at any time after launch by means of the parachute.

The missile can be launched in various different ways to be able to cover as wide a use spectrum as possible. The missile can be launched independently under its own power vertically or at an angle of less than 90° to the earth's surface. The missile can thus launch from a cannister or from a container. Thanks to its ability to launch vertically, the missile can also be easily launched into the air by hand. Furthermore, the missile can be carried by another missile and also launched from there. For example, the missile can be launched from an aircraft. The missile can furthermore be mounted on a drone or on another flying object and launched from there.

Figure 2:
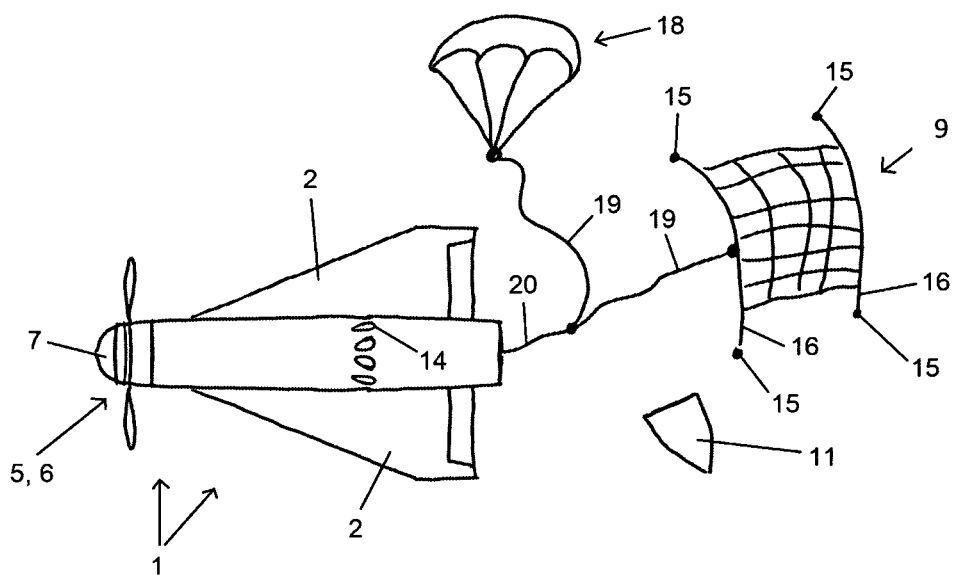
Figure 3:
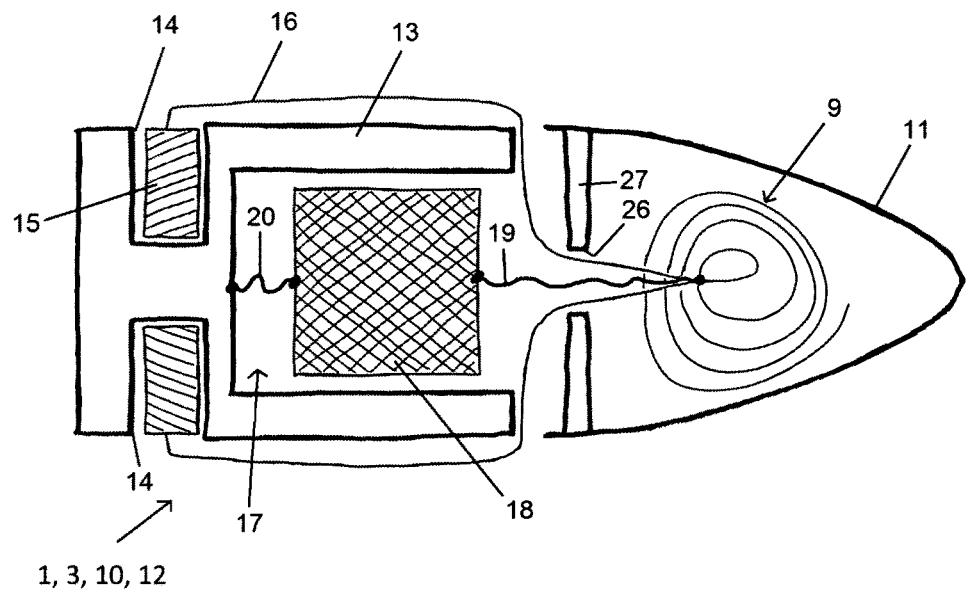
Figure 4:
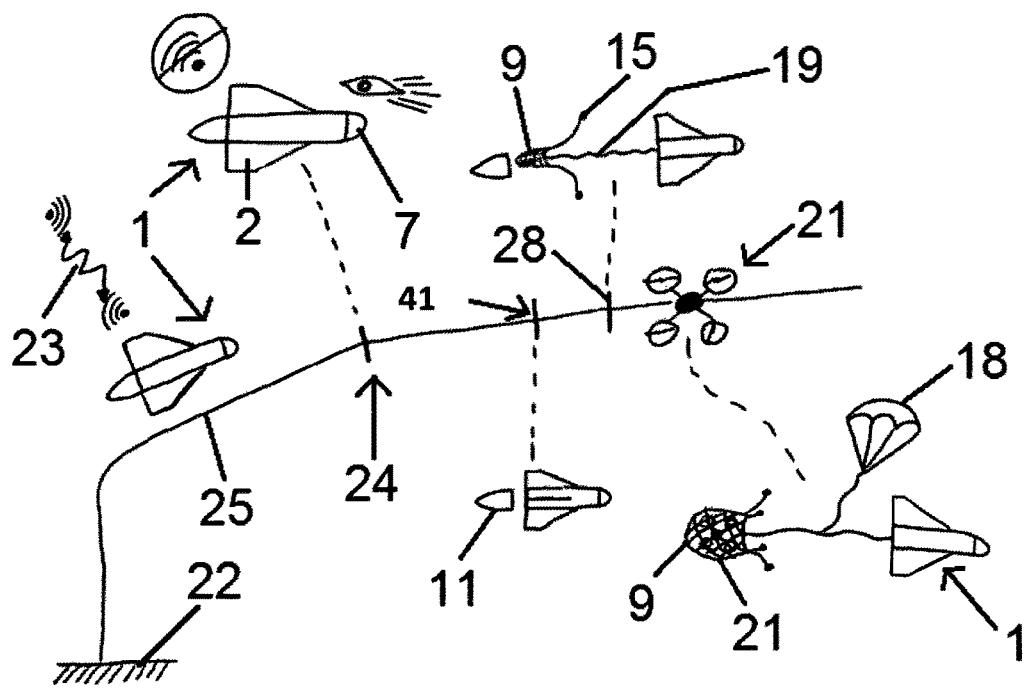
Figure 5:
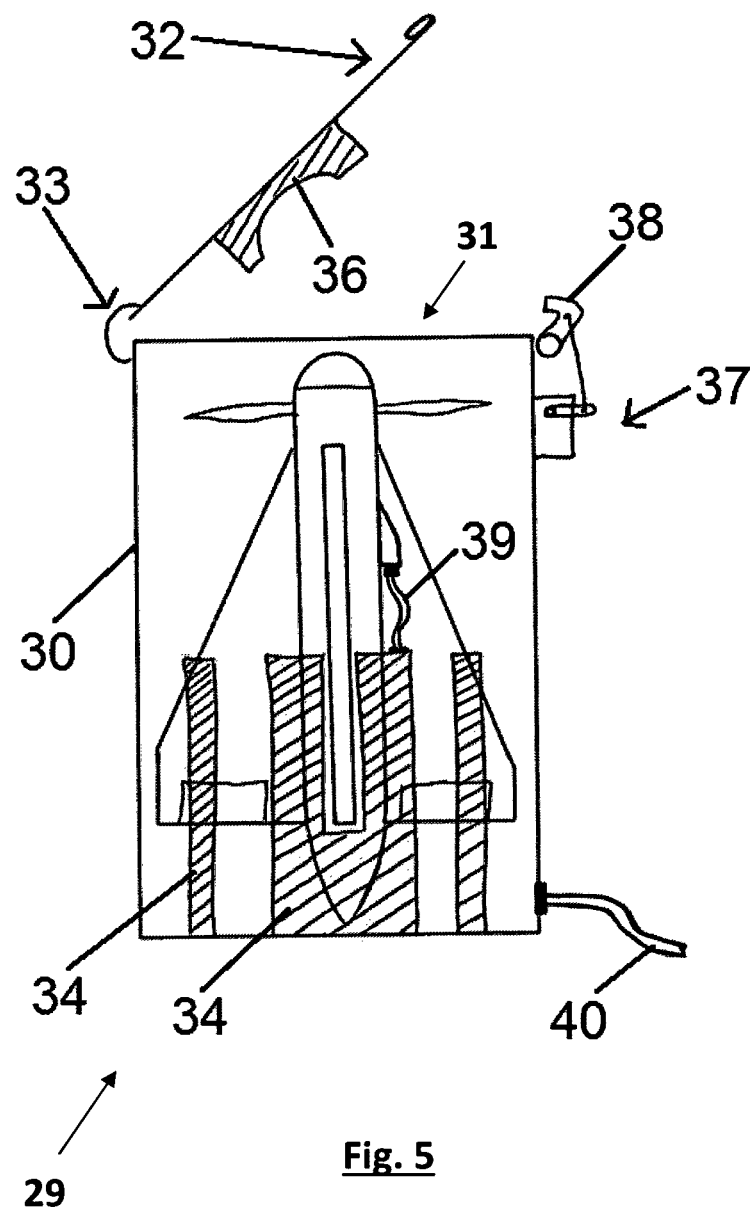
Figure 6:
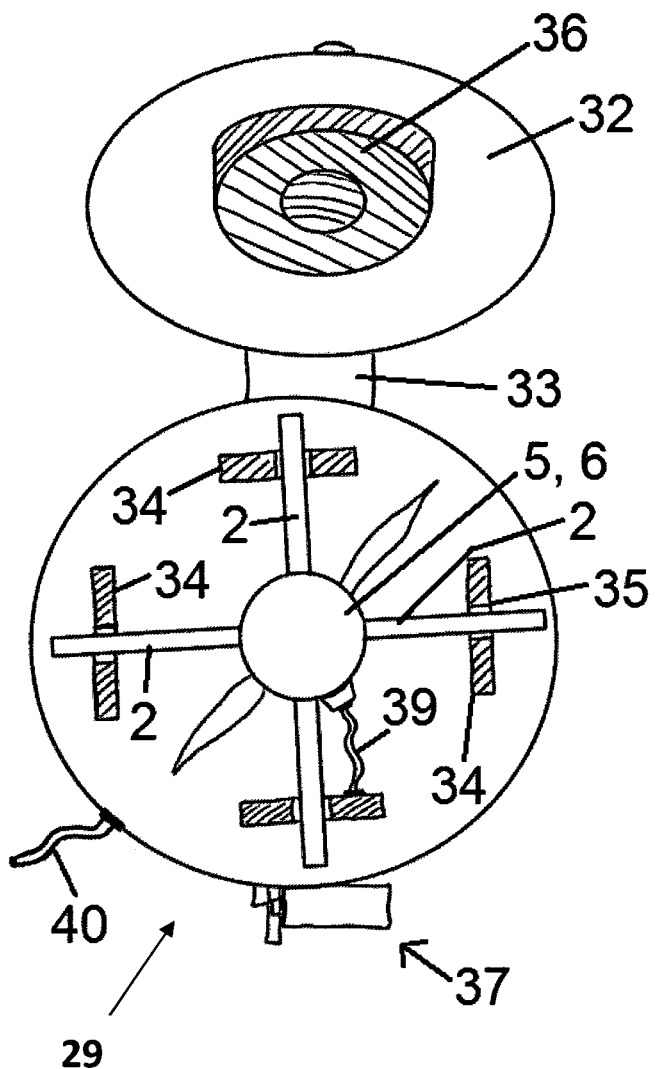
Figure 7:
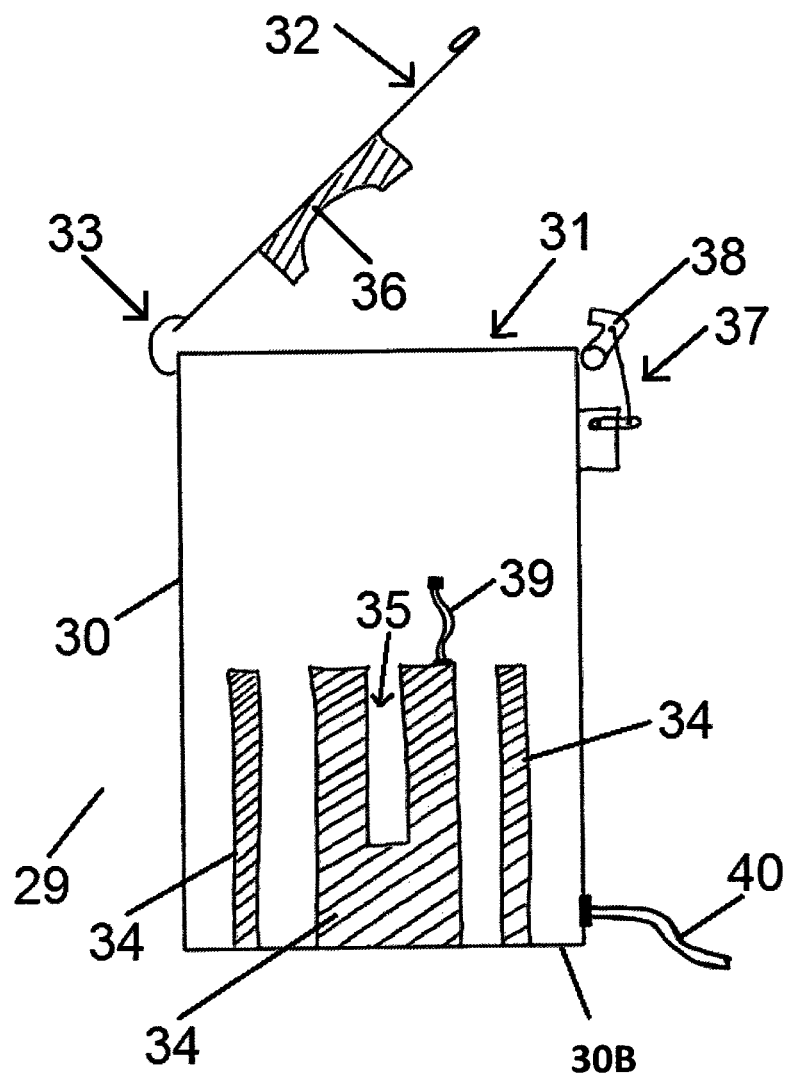
Figure 8:
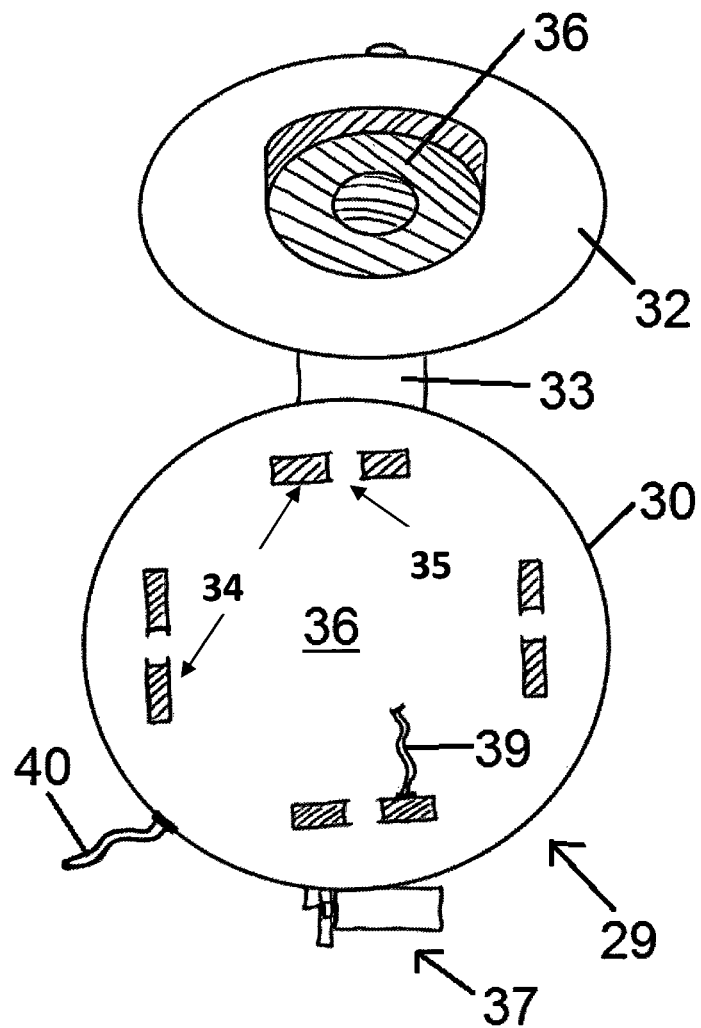

There are now a number of possibilities for configuring and further developing the missile according to the invention in advantageous different ways. For this purpose, reference can first be made to the claims subordinate to claim 1. In the following, preferred embodiments of the invention are described in detail using the drawing and the associated description. In the drawing:

FIG. 1 shows a schematic view of a missile for intercepting alien drones,

FIG. 2 shows a schematic side view of the missile of FIG. 1, wherein here a capturing net and a parachute have already been ejected, FIG. 3 shows a schematic sectional view of a part of the missile of FIGS. 1 and 2, for example a rear fuselage part, which forms a replaceable unit and comprises the capturing net and the parachute, FIG. 4 shows a schematic representation of a trajectory of the missile, wherein an alien drone is captured, FIG. 5 shows a schematic sectional view of a container with the missile, wherein the missile can launch independently from the container, FIG. 6 shows a schematic top view of the opened container with the missile, FIG. 7 shows a schematic sectional representation of the opened container without the missile, and FIG. 8 shows a schematic top view of the container without the missile.

A missile 1 can be clearly seen in FIGS. 1 to 4. The missile 1 has the form of a rocket. The missile 1 comprises a plurality of wings 2, in particular three or more wings 2, wherein each wing 2 in particular comprises an aileron 4. In particular, four wings 2 are arranged evenly spaced circumferentially around a fuselage 3.

A drive 5, in particular in the form of a propeller drive 6, is provided in a front area of the fuselage 3. The drive 5 preferably has an electric motor. The form of the missile 1 is selected such that the missile 1 can be easily controlled around all transverse axes by means of the aileron 4. The wings 2 are wider in the rear area of the missile 1 than in the front area, i.e. they substantially taper towards the fuselage 3 in the direction of the drive. Thus, the missile 1 substantially has the form of a rocket which allows for a high-top speed. The top speed of the missile 1 is preferably more than 100 km/h, in particular more than 200 km/h, preferably in the range between 250 km/h and 350 km/h. This ensures that the missile 1 can be used with a high differential speed to an alien drone 21 which facilitates the capture of the alien drone 21 with the above-mentioned missile 1.

The tip of the fuselage 3 is formed by a seeker 7, wherein the seeker 7 has at least one, in particular a plurality of sensors. The seeker 7 is arranged in front of the drive 5. The sensors can comprise electro-optical sensors or radar sensors. It is conceivable for the seeker 7 as an optical system to have a camera, in particular a 4K camera.

Behind the drive 5, the fuselage 3 comprises a central fuselage part 8. Preferably, the on-board electronics and/or a power supply are arranged inside the central fuselage part 8. To capture the alien drone 21, the missile 1 now has a capturing net 9 which in FIG. 3 is arranged packed in a rear fuselage part 10, for example in particular in a container 11 at the end of the rear fuselage part 10. The internal diameter of the container 11 is larger than an opening 26 in the base 30B of the container so that the capturing net 9 is only gradually pulled out to avoid it becoming entangled. Flexible connection means 16, 19 are led through the opening 26 which connect the capturing net 9 to the weights and a parachute 18.

The capturing net 9 is arranged in the container 11 in the form of a coiled rope and thus forms a winding. An end of the rope connected to the weights 15 is located inside the winding and a free end of the rope is outside of the winding, i.e. on the inside wall of the container 11. By means of this spiral-formed winding it is ensured that the capturing net 9 is gradually pulled out when the container 11 is ejected without it becoming entangled.

The unfolded state of the capturing net 9 is represented in FIG. 2. The rear fuselage part 10 is made up of several individual components, for example a fuselage part 13 and the container 11, among others. In a preferred embodiment, the rear fuselage part 10 forms a replaceable unit 12. This facilitates the reloading and repair of the missile 1 after an interception attempt. A plurality of replaceable units 12 can be provided so that the missile 1 can be quickly made ready for use.

This replaceable unit 12 comprises the fuselage part 13, wherein a plurality of ejector receptacles 14 with corresponding weights 15 arranged therein are arranged on the fuselage part 13. The ejector receptacles 14 and the weights are arranged in the area of the centre of gravity of the missile 1. The ejector receptacles 14 are thus aligned such that the weights 15 can be ejected to transverse to the flight direction and also transverse to the longitudinal direction of the missile 1. It is conceivable that the ejector receptacles 14 are thus aligned substantially radially or that the ejector receptacles 14 point obliquely backwards. The weights 15 serve to span the capturing net 9. Thus, the weights 15 are connected to the capturing net 9. In particular, a rope, a belt or another flexible connection means 16 can be used as a connection. This connection means 16 is connected to a weight 15 on the one hand and connected to a circumference of a capturing net 9 (not shown in detail). Preferably, at least three weights 15 and at least three corresponding ejector receptacles 14 are provided. In the embodiment shown, four weights 15 and four corresponding ejector receptacles 14 are used. In the spread-out state, the capturing net 9 can in particular be four-sided, in particular square. In an alternative embodiment, it is conceivable to use a three-sided, five-sided, six-sided or even a round capturing net 9.

The fuselage part 13 has a hollow space 17, wherein a parachute is arranged inside the hollow space 17. The hollow space 17 is opened in the direction of the container 11. The parachute 18 is connected to the capturing net 9 via a further flexible connection means 19 and preferably connected to the fuselage part 13 via a further flexible connection means 20. When the capturing net 9 is ejected together with the parachute 18 as will now be described in the following (cf. FIG. 2), the missile 1 and the capturing net 9 are safely brought to the ground together with the captured alien drone 21 if present.

The missile 1 now has a first means (not shown here) for ejecting the container 11. The means can in particular be arranged on the front side of the fuselage part 13 facing the container 11. These means can be formed pneumatically or by a pyrotechnic propellant, for example. The means can be triggered via the on-board electronics. The ejector receptacles 14 can also be actuated via the on-board electronics. It is conceivable that the ejector receptacles 14 can also be confirmed by pneumatic means or by pyrotechnic propellants.

Furthermore, means to eject the parachute 18 are provided. These means assigned to the capturing net 9, the weights 15 and the parachute 18 can be triggered in any desired sequence.

The process of the method for intercepting the alien drone 21 will now be described in more detail using FIG. 4. First, the missile 1 is launched from the ground 22. A radar system or another sensor system, for example, can be arranged on the ground that detects the appearance of the alien drone 21. This system transmits the coordinates and/or the direction vector of the alien drone 21 to the missile 1 via a radio connection 23. It is conceivable that the missile 1 is initially controlled from the ground. At a point 24 along the flight path 25, the seeker 7 now detects the alien drone 21. Hereafter, the on-board electronics guide the missile 1 in the direction of the alien drone 21 without external influence, i.e. without the use of the radio connection 23. The speed of the alien drone 21 is preferably determined by a seeker 7 or by the sensor on the ground 22. Furthermore, the speed of the missile 1 is preferably determined. Depending on the distance from the missile 1 and in particular depending on the relative speed between the alien drone 21 and the missile 1, the container 11 is ejected with the described means at a certain point 41. This leads to the capturing net 9 being pulled out through the opening 26 (cf. FIG. 3) in the base 27 of the container 11.

At a later point in time, at a later point 28 of the flight path, the weights 15 are then ejected out of the ejector receptacles 14, whereby the capturing net 9 is spanned. This point in time is selected such that the alien drone 21 can thus be securely captured. The flight path of the missile 1 is thus adapted to the flight path of the alien drone 21 such that the alien drone 21 can also be captured taking into account the braking effect of the capturing net 9 on the missile 1. By capturing the alien drone 21, the parachute 18 is now also pulled out of the hollow space 17 and the missile 1 now floats to the ground together with the capturing net 9 and the captured alien drone 21.

It has proven to be particularly advantageous that the container 11 and the weights are ejected at different points in time, i.e. first the capturing net 9 and then at a later point in time the weights 15. Thus, the capturing net 9 is first unrolled and only when the capturing net 9 has substantially left the container 11 is it spanned by the weights 15. The time difference between these two points in time depends in particular on the airspeed of the missile 1.

In the following, a preferred launching arrangement 29 will now be described. The launching arrangement 29 comprises a container 30, wherein the missile 1 is initially arranged in the container 30. The container 30 has an opening 31 which is initially closed by a cover 32. The cover 32 is arranged on the launch container 30 such that it can be pivoted by a hinge 33. A plurality of guide elements 34 are arranged inside the container 30, wherein the guide elements 34 are designed substantially U-shaped so that the wings 2 of the missile 1 are held in a slot 35. The missile 1 is thus arranged in the container 30 such that the tip or the bow of the missile 1 is arranged with the drive close to the cover 32 and the rear is arranged substantially between the guide elements 34 close to the base 30B of the container 30. The cover 32 has a damper 36 inside of it. The damper 36 is thus opposite the tip, i.e. the seeker 7 of the missile 1.

A closing mechanism 37 is now arranged on the side of the container 30 opposite the hinge 33. A hook 38 of the closing mechanism 37 is shown here. The closing mechanism 37 is electrically actuatable, for example by means of a servo, so that the closing mechanism 37 securely locks the cover 32 in a base position and after a corresponding activation releases the cover 32. It is conceivable for the cover 32 to be substantially swung into the opened stated by a spring or similar. Alternatively, it is conceivable for the cover to be pushed open by the launching of the missile 1 alone.

The signal to open the cover 32 is now transmitted from the on-board electronics of the missile 1 to the closing mechanism 37. Thus, the missile 1 is coupled to the closing mechanism 37 by means of a connecting line 39 The missile 1 is again connected to a ground station via a radio connection 23 so that the ground station gives the signal to launch the missile 1, the on-board electronics automatically send a signal to the closing mechanism 37 via the connecting line 39 that the cover 32 should now be opened or the hook 38 should now be retracted in order to release the cover 32. The connecting line 39 is thus plugged into a jack (not shown in detail) on the missile 1 so that a data connection to the on-board electronics is established. The power to open or to activate the closing mechanism 37 is preferably supplied externally via a power supply 40.

This launching arrangement 29 has the advantage that the launching arrangement 29 can protect the missile 1 from external weather conditions and at the same time does not comprise any delicate electronics as these are provided by the on-board electronics of the missile 1. This facilitates inexpensive production of the launching arrangement 29. Now, when the signal to launch is given by the ground station, the drive 5 is activated, i.e. the propeller begins to rotate and the cover 32 is swung to the side by the resulting thrust, so that the opening 31 of the container 30 is released and the missile 1 passes out of this opening 31 out into the open.

LIST OF REFERENCE NUMERALS

1 Missile
2 Wing
3 Fuselage
4 Aileron
5 Drive
6 Propeller drive
7 Seeker
8 Central fuselage part
9 Capturing net
10 Rear fuselage part
11 Container
12 Replaceable unit
13 Fuselage part
14 Ejector receptacle
15 Weights
16 Flexible connection means
17 Hollow space
18 Parachute
19 Flexible connection means
20 Flexible connection means
21 Alien drone
22 Ground
23 Radio connection
24 Point on flight path
25 Flight path
26 Opening
27 Base
28 Point on flight path
29 Launching arrangement
30 Container
30B Base of the container
31 Opening
32 Cover
33 Hinge
34 Guide element
35 Slot
36 Damper
37 Closing mechanism
38 Hook
39 Connecting line
40 Power supply
41 Point on flight path

The invention claimed is:

1. Missile (1) for intercepting alien drones (21) comprising a capturing net (9) and a parachute (18), wherein a plurality of weights (15) are connected to the capturing net (9), wherein the capturing net (9) can be ejected from the missile (1), wherein the weights (15) can be ejected from the missile, characterized in that the capturing net (9) can be ejected by means of a first means and the weights (15) can be ejected by means of a second means, wherein the weights (15) and the capturing net can be ejected from the missile (1) at different points of time.

2. The missile of claim 1, characterized in that the time difference between the ejection of the capturing net (9) and the weights (15) can be selected depending on the current airspeed of the missile (1).

3. The missile of claim 1, characterized in that the capturing net (9) is arranged in a container (11), wherein the container (11) forms a rear area of the missile (1), wherein the container with the capturing net (9) can be ejected by the first means.

4. The missile of claim 1, characterized in that the weights (15) are arranged in ejector receptacles (14), wherein the ejector receptacles (14) are arranged in the longitudinal direction of the missile (1) seen in front of the container (11).

5. The missile of claim 1, characterized in that the missile (1) comprises a replaceable unit (12), wherein the replaceable unit (12) comprises the capturing net (9), the weights (15) and the ejector receptacles (14).

6. Missile according to claim 5, characterized in that the replaceable unit (12) comprises a fuselage part (13), wherein the fuselage part (13) comprises a hollow space (17), wherein a parachute (18) is arranged in the hollow space (17), wherein the parachute (18) is connected to the fuselage part (13) and/or the capturing net (9) via a flexible connection means (19, 20).

7. Missile according claim 6, characterized in that the hollow space (13) adjoins the container (11), wherein the container (11) comprises an opening (26), wherein the capturing net (9) is connected to the weights (15) and/or a parachute (18) via a flexible connection means (16, 19) and this connection means (16, 19) or the capturing net (9) are guided through the opening (26).

8. The missile of claim 1, characterized in that the internal diameter of the container (11) is larger than the opening (26).

9. The missile of claim 1, characterized in that the capturing net (9) in the form of a coiled rope is arranged in the container (11) and thus forms a winding, wherein an end of the rope connected to the weights (15) is found inside the winding and a free coil end is found on the outside of the winding.

10. The missile of claim 1, characterized in that the missile (1) has the form of a rocket.

11. The missile of claim 1, characterized in that the missile (1) comprises a plurality, in particular more than three circumferentially spaced wings (2).

12. The missile of claim 1, characterized in that the missile (1) has a drive (5), in particular a propeller drive (6) in front of the center of gravity of the missile (1) in the direction of flight.

13. The missile of claim 1, characterized in that the weights (15) are arranged in the area of the center of gravity of the missile (1).

14. The missile of claim 1, characterized in that the maximum airspeed of the missile (1) is over 100 km/h, in particular over 200 km/h.

15. The missile of claim 1, characterized in that the first means and/or the second means are formed by at least one pyrotechnic propellant and/or a means operating with pressurized air.

16. The missile of claim 1, characterized in that a means for ejecting the parachute (18) from the hollow space (13) is provided.

* * * * *